(12) United States Patent
Himmelmann

(10) Patent No.: US 10,371,137 B2
(45) Date of Patent: Aug. 6, 2019

(54) METERING FOR FLUID MOTOR AND PUMP COMBINATION

(71) Applicant: HAMILTON SUNDSTRAND CORPORATION, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 213 days.

(21) Appl. No.: 15/256,790

(22) Filed: Sep. 6, 2016

(65) Prior Publication Data
US 2018/0066646 A1    Mar. 8, 2018

(51) Int. Cl.
    *F04B 43/10*      (2006.01)
    *B64G 1/60*      (2006.01)
    (Continued)

(52) U.S. Cl.
    CPC ............... *F04B 43/10* (2013.01); *B64G 1/60* (2013.01); *F04B 9/042* (2013.01); *F04B 9/10* (2013.01);
    (Continued)

(58) Field of Classification Search
CPC .......... C02F 1/685; C02F 1/686; C02F 1/687; B01F 15/0245; F04B 9/08; F04B 9/10; F04B 13/00; F04B 13/02; F04B 15/00; F04B 15/04; F04B 19/04; F04B 23/00; F04B 23/02; F04B 23/025; F04B 23/12; F04B 43/10; F04B 43/12; F04B 43/1253; F04B 43/1261; F04B 43/1276; F04B 43/12924; F04B 9/042; F04B 43/1292; F04B 49/02; F04B 43/0081; F04B 45/073; B64G 1/60
(Continued)

(56) References Cited

U.S. PATENT DOCUMENTS 3,053,842 A * 9/1962 Meissner ............ B01F 15/0416
                                                                                 137/98
3,140,666 A    7/1964   Currie
(Continued)

FOREIGN PATENT DOCUMENTS

FR        2607194 A1    5/1988
GB       2502584 A      12/2013
(Continued)

OTHER PUBLICATIONS

European Search Report for European Application No. 17189710.1, dateed Dec. 21, 2017.

*Primary Examiner* — Alexander B Comley
*Assistant Examiner* — Chirag Jariwala
(74) *Attorney, Agent, or Firm* — Carlson, Gaskey & Olds, P.C.

(57) ABSTRACT

A system has a fluid motor for receiving a pressurized fluid motor causing actuation of the fluid motor, with the fluid motor having a motor inlet and a motor outlet. The motor fluid is delivered from the motor outlet into a container. The motor rotor drives a pump rotor. The pump rotor drives a fluid from a pump inlet to a pump outlet, with the pump outlet being connected into the container. A metering system allows a precise amount of rotation of the motor rotor and the pump rotor to meter the motor fluid and the pump fluid into the container.

18 Claims, 8 Drawing Sheets

(51) Int. Cl.
*F04B 9/04* (2006.01)
*F04B 43/12* (2006.01)
*F04B 49/02* (2006.01)
*F04B 9/10* (2006.01)
*F04B 13/02* (2006.01)
*F04B 15/04* (2006.01)

(52) U.S. Cl.
CPC .............. *F04B 13/02* (2013.01); *F04B 15/04* (2013.01); *F04B 43/1253* (2013.01); *F04B 43/1292* (2013.01); *F04B 49/02* (2013.01)

(58) Field of Classification Search
USPC ....... 210/198.1, 205, 206; 141/67, 100, 104; 417/214, 376, 391; 74/567, 569; 222/263; 4/318, 320, 321, 431, 459
See application file for complete search history.

(56) References Cited

U.S. PATENT DOCUMENTS

| | | |
|---|---|---|
| 3,306,229 A | 2/1967 | Smythe |
| 3,431,864 A | 3/1969 | Jones, Jr. |
| 3,662,888 A * | 5/1972 | Kemper .................. E03D 5/016 210/167.3 |
| 3,831,617 A | 8/1974 | Livingston |
| 4,012,176 A | 3/1977 | Drori |
| 4,118,315 A | 10/1978 | Fletcher et al. |
| 4,997,347 A | 3/1991 | Roos |
| 5,243,897 A | 9/1993 | Walton et al. |
| 5,269,443 A | 12/1993 | Lancaster |
| 5,513,963 A | 5/1996 | Walton |
| 6,224,347 B1 | 5/2001 | Clark et al. |
| 6,993,795 B2 | 2/2006 | Prineppi |
| 7,544,050 B1 | 6/2009 | Hunt et al. |
| 2010/0205732 A1 | 8/2010 | Muhlhausen et al. |
| 2015/0104330 A1* | 4/2015 | Chin .................. F04B 43/1238 417/53 |
| 2016/0251242 A1 | 9/2016 | Braden |

FOREIGN PATENT DOCUMENTS

| | | |
|---|---|---|
| NL | 7709840 A | 3/1978 |
| WO | 94/04257 A1 | 3/1994 |
| WO | 2008/083323 A1 | 7/2008 |
| WO | 2012046162 A1 | 4/2012 |
| WO | 2014/058825 A1 | 4/2014 |

* cited by examiner

METERING FOR FLUID MOTOR AND PUMP COMBINATION

BACKGROUND OF THE INVENTION

This application relates to metering fluid from a fluid motor and pump combination.

Many types of pumps have been developed for different applications. One type pump, which may be utilized to move a harsh fluid, is a peristaltic pump. In a common peristaltic pump, a rotor carries a plurality of rollers, which are moved along a tube. A fluid to be moved is received in the tube. The rollers pinch the tube and as they rotate along the tube, they move the fluid from an inlet to an outlet.

It has also been proposed to utilize a peristaltic system such as described above, but in a reverse operation as a motor. However, a peristaltic motor has never been proposed to drive a peristaltic pump.

Again, many systems utilize pumps. One such system is a urine treatment system for use on a spacecraft. In such a system, the water in the urine must be purified for reuse. It is known to deliver urine into a container. The urine is mixed with a quantity of water and an acid. This is part of the treatment for separating the water from the urine such that it can be reused.

Systems for moving the water and metering the acid are somewhat complicated.

Of course, there are other applications for a system to meter two fluids to mix.

SUMMARY OF THE INVENTION

A system has a fluid motor for receiving a pressurized fluid causing actuation of the fluid motor, with the fluid motor having a motor inlet and a motor outlet. The motor fluid is delivered from the motor outlet into a container. The motor rotor drives a pump rotor. The pump rotor drives a fluid from a pump inlet to a pump outlet, with the pump outlet being connected into the container. A metering system allows a precise amount of rotation of the motor rotor and the pump rotor to meter the motor fluid and the pump fluid into the container.

These and other features may be best understood from the following drawings and specification.

DETAILED DESCRIPTION

Figure 1:
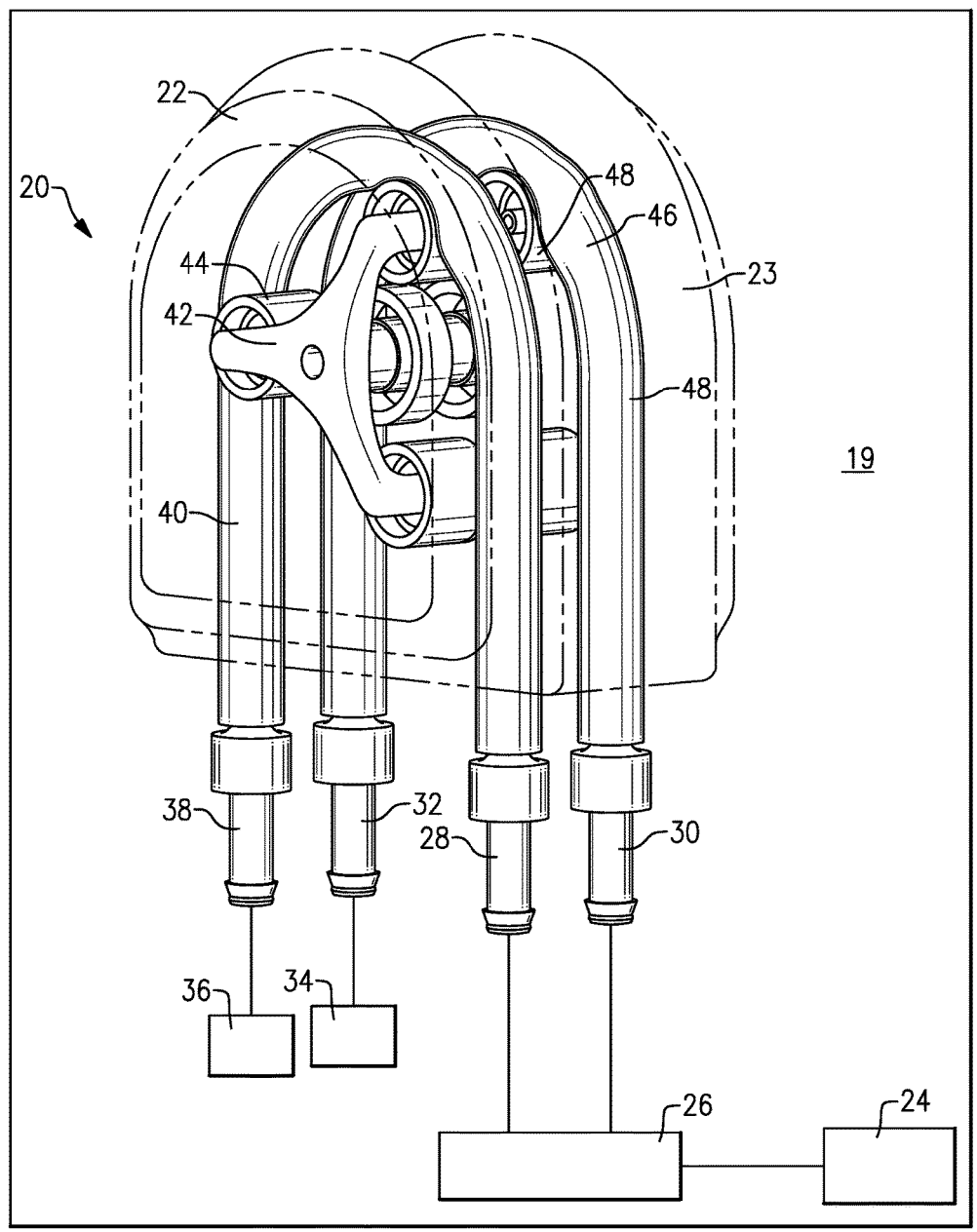
FIG. 1 shows a water treatment system.

A water treatment system 20, such as may be utilized on a spacecraft 19, includes a combined peristaltic motor and pump 22. A surrounding housing 23 is shown in phantom. A toilet 24 is shown schematically and will deliver urine into a container 26. A water outlet 28 delivers a quantity of water into the container 26. An acid outlet 30 also delivers an acid into the container 26. It may be that the acid from outlet 30 and water from outlet 28 mix before reaching the container 26. The use of the combined water and acid to treat the urine and removed water from the urine is generally as known.

An acid inlet 32 receives an acid from a source 34. A water supply 36 delivers pressurized water into a motor inlet 38.

In a spacecraft application, a main source of drive would be pressurized water. As such, the combined peristaltic pump and motor 22 provide valuable benefits in that the pressurized water is utilized as a driving force for the acid pump as will be explained below.

Since the water source 36 is the potable water for the spacecraft, it is important to keep the acid and water separate until being mixed. The combined peristaltic pump and motor 22 achieve this goal.

A motor tube 40 is shown along with a rotor 42. Rotor 42 rotates and moves rollers 44 along a length of the tube 40. Another tube 46 is a pump tube. Rollers 48 from a pump rotor (not shown in this figure) move along the tube 46.

Figure 2:
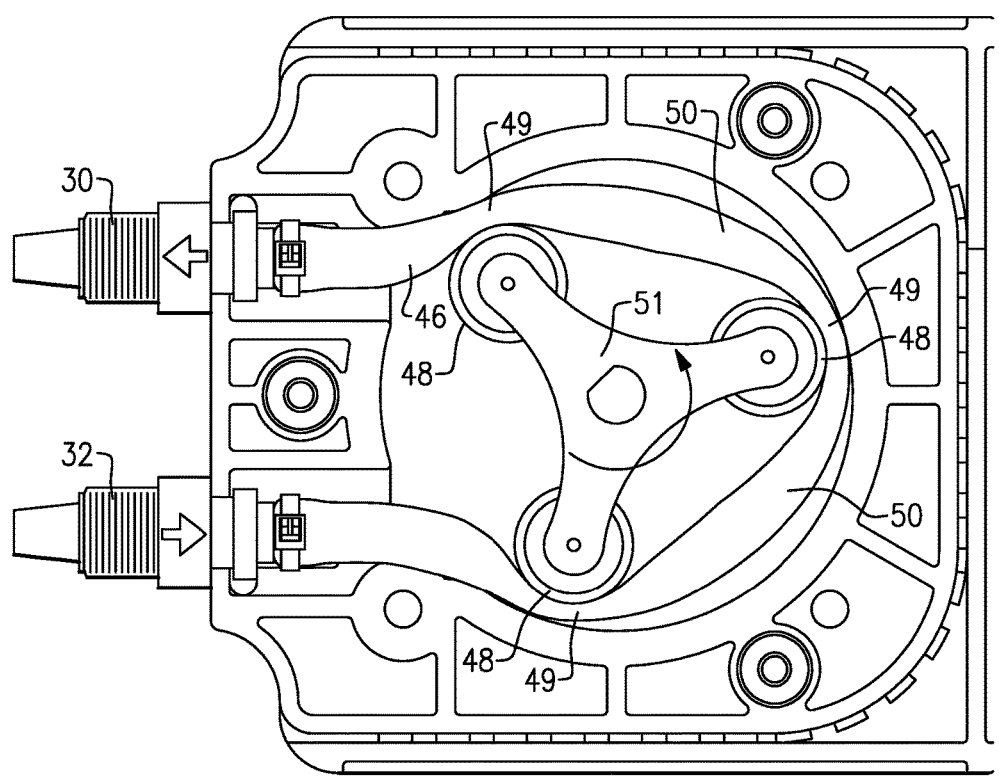
FIG. 2 shows a feature of a peristaltic pump.

FIG. 2 shows the operation of the peristaltic pump for moving the acid. As shown, the rotor 51 is driven to rotate the rollers 48. The rollers pinch the tube as shown at 49. Intermediate the tube pinch points 49 is a pumping chamber 50. Fluid to be moved is trapped in the chamber 50 between the two pinch points 49. As the rotor 51 continues to rotate, the fluid is moved from the inlet 32 toward the outlet 30. As can be appreciated, the fluid in the pump is acid and will be maintained separate from the fluid in the motor, potable water, since each fluid is received in its respective tubes.

The motor side works in the opposed direction. That is, pressurized water is directed into the inlet 38 and will drive the motor rotor 42 by causing the pinch points between the rollers 44 to drive the rollers and hence the rotor to rotate. Thus, as the pressurized water moves from its inlet 38 to its outlet 28, it causes the rotor 42 to rotate. This, in turn, causes the pump rotor 51 to rotate.

Figure 3:
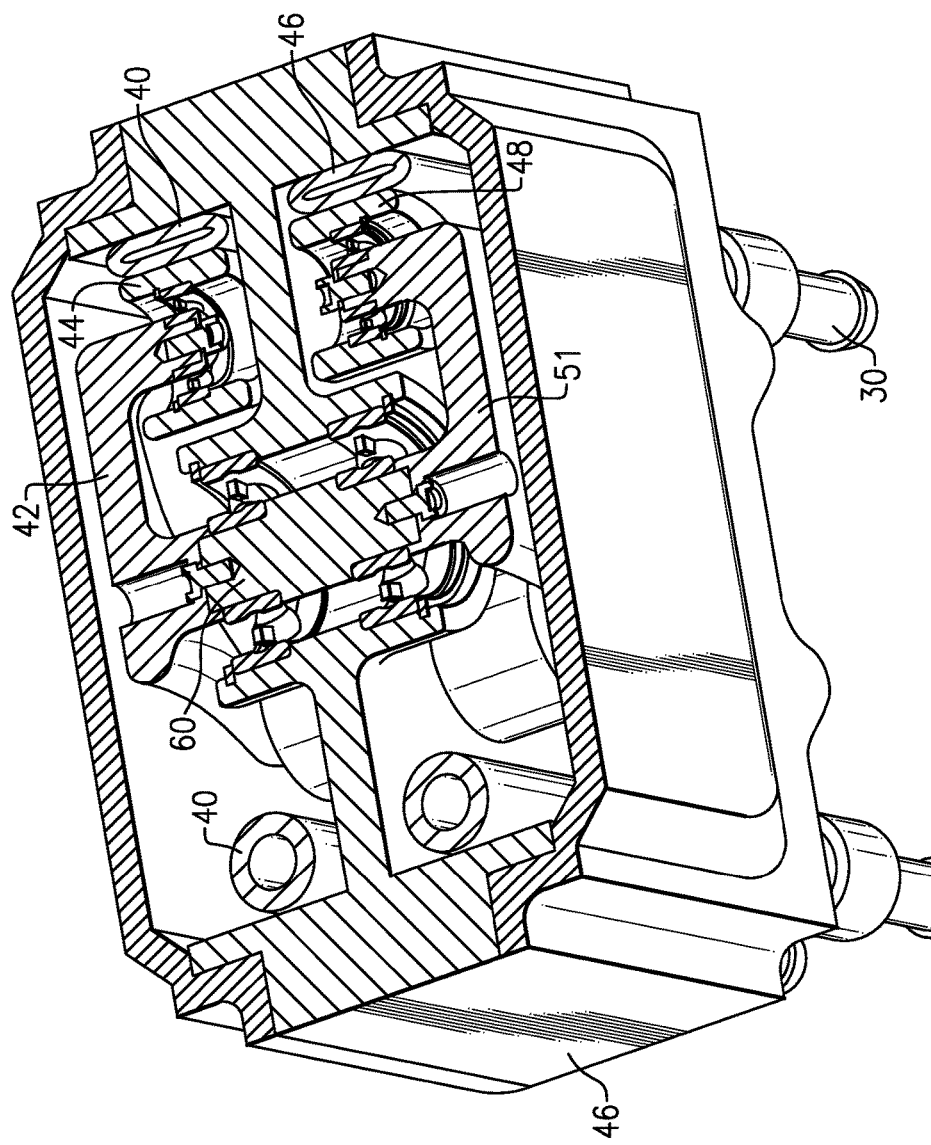
FIG. 3 shows details of the combined peristaltic pump and motor.

FIG. 3 shows further details. A connecting shaft 60 connects rotors 42 and 51. The tubes 40 and 46 are shown as well as the rollers 44 and 48.

Thus, a combined peristaltic pump and motor is provided to drive a fluid from an inlet to an outlet.

When utilized to deliver the acid and pressurized water into the container, it should be understood that precise metering of the two fluids is desirable. Of course, part of achieving the accurate metering would be controlling the relative sizes of the tubes 40 and 46, including cross-section and length. Generally, a worker, armed with the above disclosure, would know how to achieve such metering.

Figure 4A:
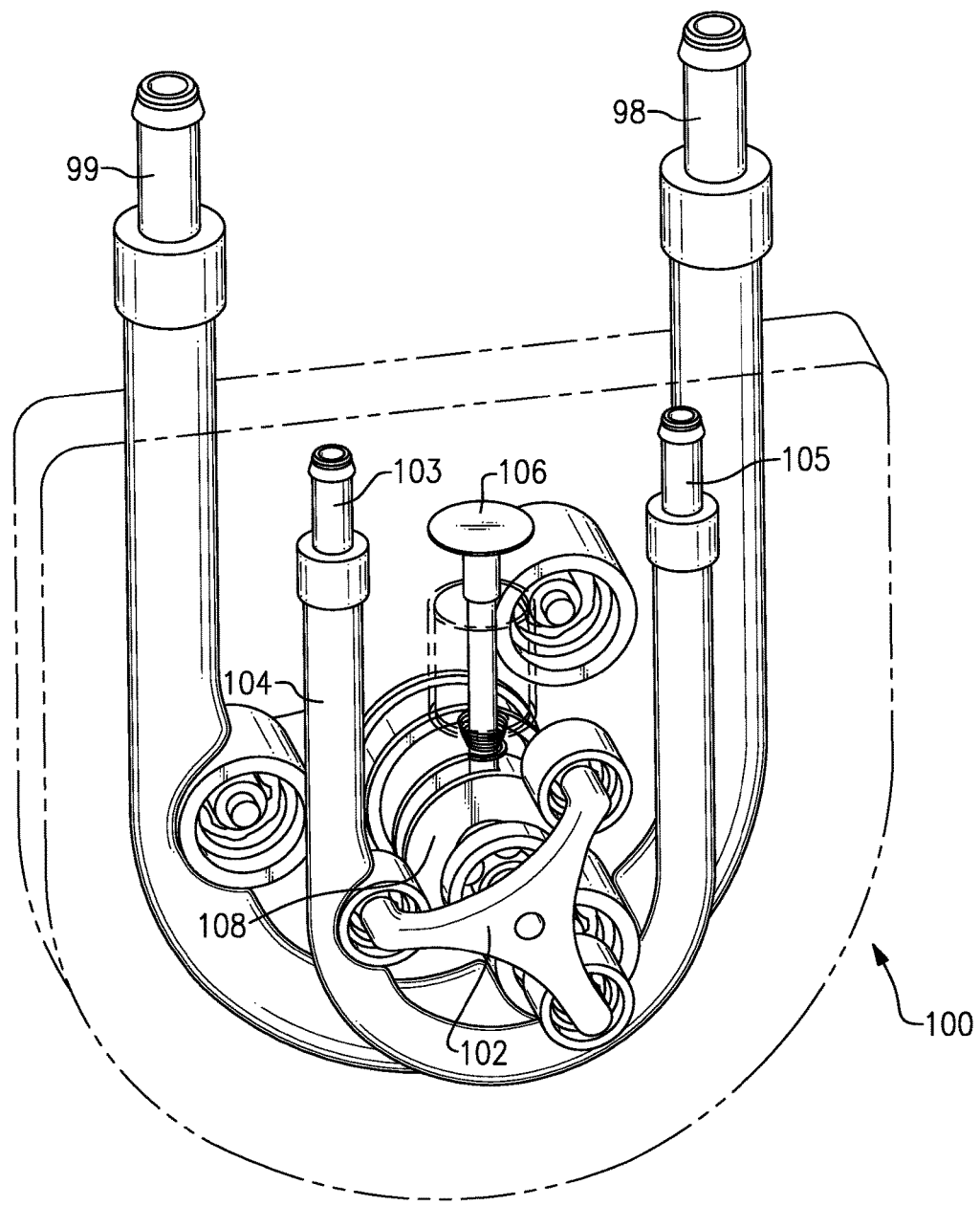
FIG. 4A shows a first metering embodiment.

FIG. 4A shows an embodiment 100 that will facilitate the metering of the acid and pressurized water into the container. As shown, a pump rotor 102 moves fluid from an acid inlet 103 into a pump tube 104, and then into the acid outlet 105. As described above, a water inlet 99 will receive pressurized water, drive the motor rotor, and in turn pass to the water outlet 98.

A pull trigger 106 will control the amount of rotation achieved by the pump and motor combination 100.

Figure 4B:
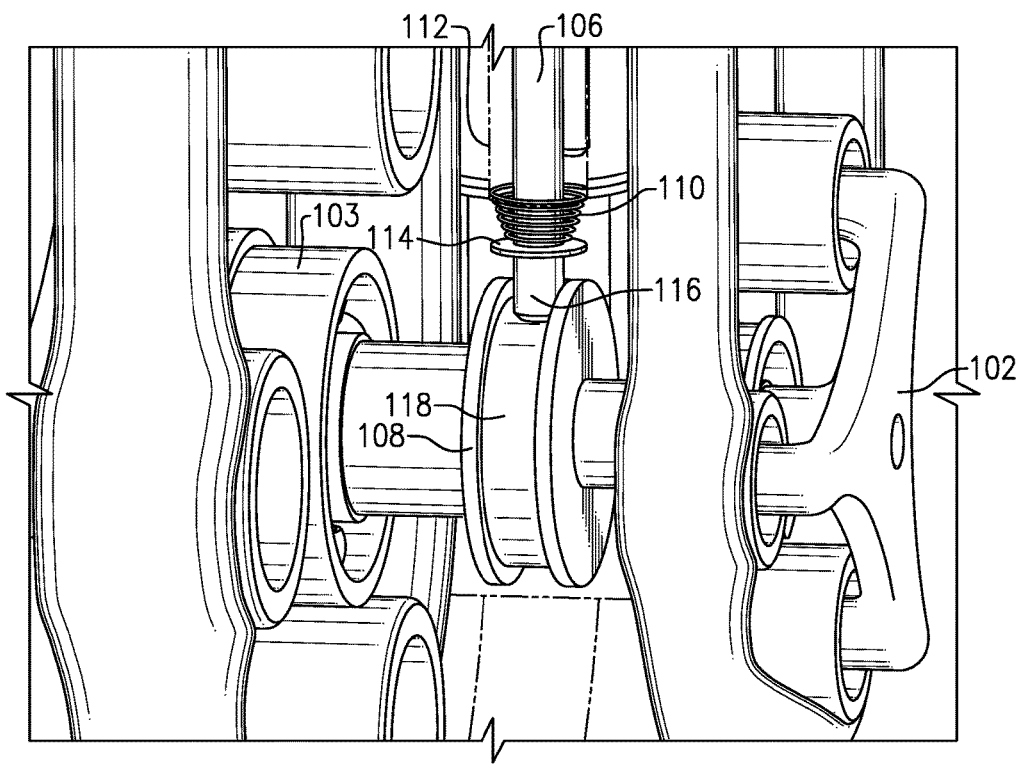
FIG. 4B shows a detail.

As shown in FIG. 4B, trigger 106 operates in conjunction with a cam 118 in rotor portion 108. Rotor portion 108 is intermediate the motor rotor and the pump rotor 102. As shown, a spring 110 is compressed against a housing 112 by a stop pin 114. An inner end 116 of the pin is removed from a cam groove 118 formed in the rotor portion 108 in the position shown in FIG. 4C. The groove 118 moves from a beginning portion 122 to an end face 120.

When a user on the spacecraft 19 has utilized and flushed a toilet, the trigger 106 may be actuated by pulling upwardly such that the end 116 is moved away from the end face 120, and out of the groove 118. This will allow the motor rotor 103 to drive the pump rotor 102.

Figure 4C:
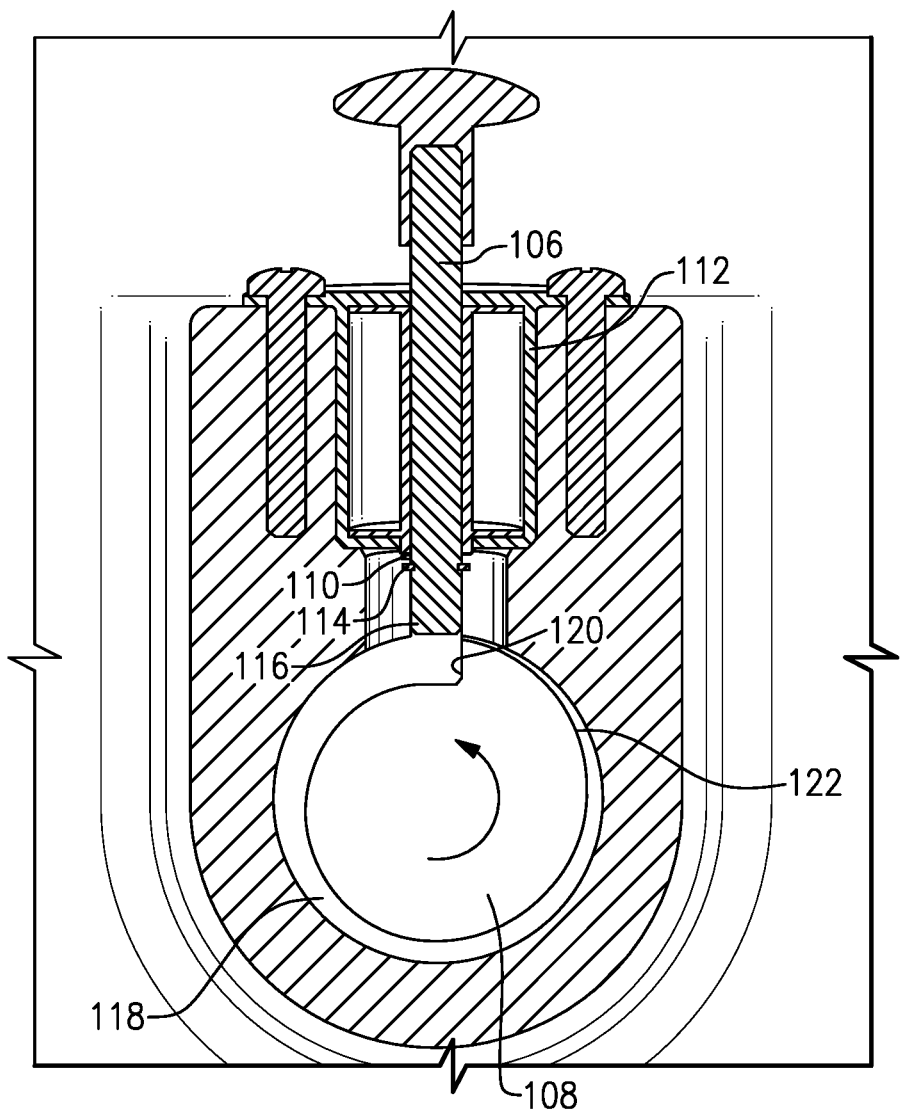
FIG. 4C shows a metering feature in a release position.

However, as can be understood from FIG. 4C, as the rotor 108 rotate with the pump and motor rotors, the end 116 will move along the outer face of the cam 118. When the rotor portion 108 has rotated counter-clockwise such that the end 116 reaches the beginning 122, the end 116 will be biased by spring 110 into the groove 118. The end 116 will continue to move along the cam 118 until it reaches stop face 120. At that point, further rotation of the motor and pump rotors will be prevented. In this manner, the system ensures a precise movement of the rotors such that a precise metering of the acid and water is achieved.

Figure 5A:
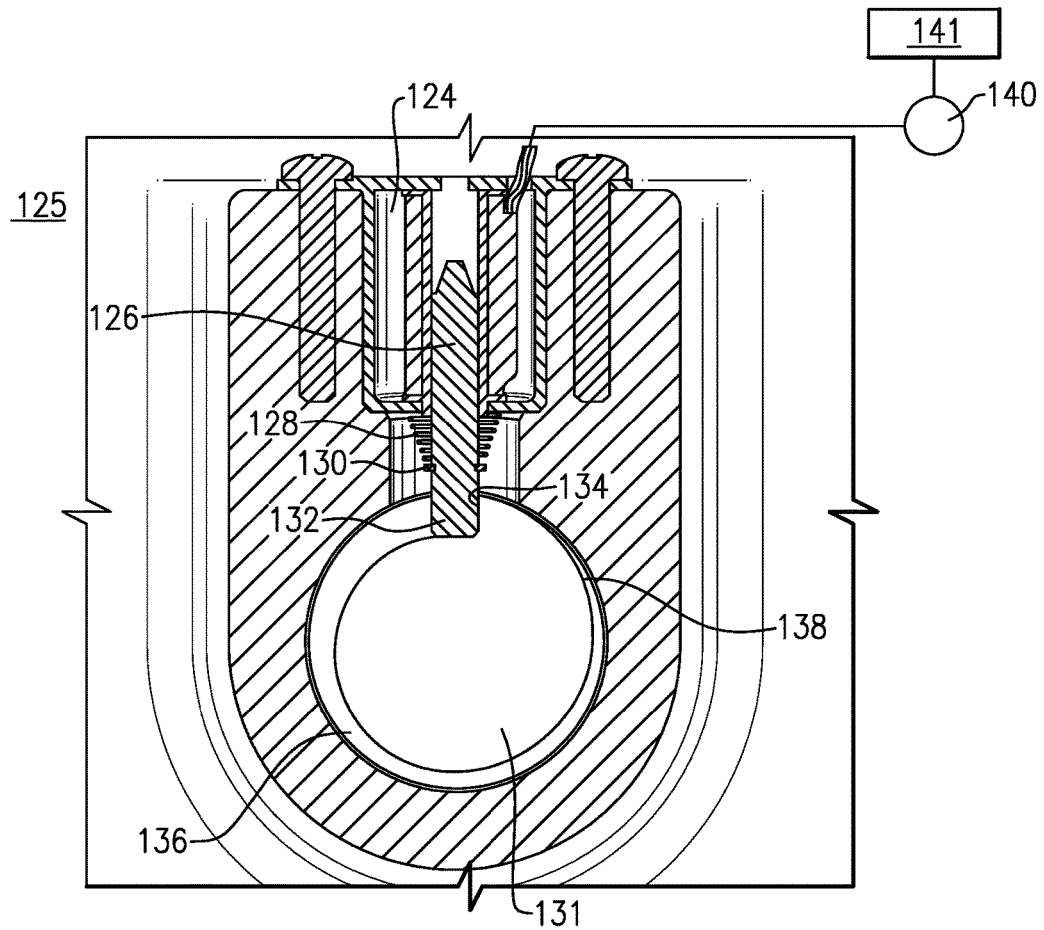
FIG. 5A shows a second embodiment.
Figure 5B:
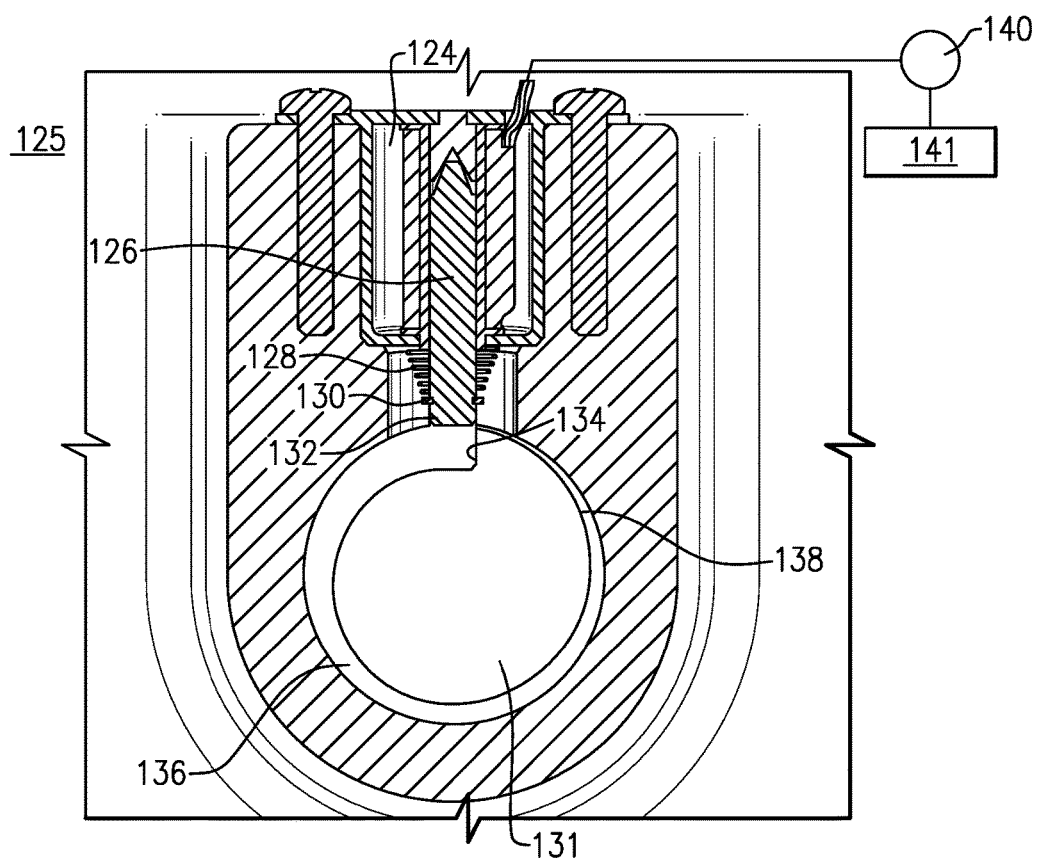
FIG. 5B shows the second embodiment in the release position.

FIG. 5A shows another embodiment 125. In embodiment 125, a pin 126 moves within a solenoid 124. The spring 128 acts against the housing of the solenoid 124, and stop pin 130, to bias the pin 126 outwardly towards the rotor 131. The end 132 of the pin 126 is shown sitting within the cam 136, and against stop face 134. Thus, in this position, the pin 126 will prevent rotation of the rotor 132, similar to the above embodiments. The groove 136 has a beginning point 138 extending to the end point or stop face 134. A control 140 is shown associated with the solenoid 124. FIG. 5B shows a position wherein the pin 126 has been actuated by actuation of the solenoid 124 to retract the pin. As the rotor 131 begins to rotate, the solenoid is again deactivated, and the spring 128 will tend to urge the pin 126 outwardly of the housing of the solenoid 124.

A control 140 for actuating the solenoid 120 communicates with a toilet 141, and in particular, its flush handle in one embodiment. Thus, when the toilet is flushed, the control 140 actuates the solenoid 124 to attract pin 126 and provide one rotation of the rotor.

While a peristaltic motor and rotor combination is shown, it should be understood that other type fluid motors and pumps may benefit from this disclosure.

In addition, a "hybrid" metering system could combine the solenoid embodiment with a mechanically movable embodiment such as that shown in FIGS. 4A-4C.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system comprising:
   a fluid motor for receiving a pressurized motor fluid causing actuation of said fluid motor, with said fluid motor having a motor inlet and a motor outlet, and said motor fluid being delivered from said motor outlet into a container, and a motor rotor driving a pump rotor, said pump rotor driving a pump fluid from a pump inlet to a pump outlet, with said pump outlet being connected into said container;
   a metering system for controlling an amount of rotation of said motor rotor and said pump rotor to meter said motor fluid and said pump fluid into said container; and
   wherein the metering system includes a meter rotor which rotates with said motor rotor and said pump rotor, and a stop pin for preventing rotation of said meter rotor after the amount of rotation of said motor rotor and said pump rotor.

2. The system as set forth in claim 1, wherein said fluid motor comprises a motor tube and said motor rotor to be driven by said motor fluid moving through said motor tube from said motor inlet to said motor outlet, and said pump including a pump tube and said pump rotor engaging said pump tube, with said pump rotor being driven to move said pump fluid through said pump tube as said motor rotor rotates.

3. The system as set forth in claim 1, wherein said metering system allowing a particular amount of rotation of said motor rotor and said pump rotor.

4. The system as set forth in claim 1, wherein said pump fluid is an acid and said motor fluid is water, and said container receives urine to be treated.

5. The system as set forth in claim 4, wherein said system is mounted on a spacecraft.

6. The system as set forth in claim 4, wherein said stop pin is biased in a direction towards said meter rotor, and said meter rotor being formed with a cam groove at an outer surface, and said stop pin being selectively movable outwardly of said cam groove to allow said metering rotor to rotate, with said stop pin being movable into said cam groove after a predetermined amount of rotation of said meter rotor, and said stop pin stopping rotation of said meter rotor after said precise amount of rotation of said motor rotor and said pump rotor.

7. The system as set forth in claim 6, wherein a spring biases said stop pin outwardly of a housing.

8. The system as set forth in claim 7, wherein said stop pin is movable away from said meter rotor by a mechanical trigger.

9. The system as set forth in claim 6, wherein a spring biases said stop pin outwardly of a housing.

10. The system as set forth in claim 9, wherein said stop pin is movable away from said meter rotor by a mechanical trigger.

11. The system as set forth in claim 9, wherein a control controls the selective movement of said stop pin outwardly of said cam groove.

12. The system as set forth in claim 11, wherein a solenoid is actuated by said control to move said stop pin against the bias force outwardly of said cam groove.

13. The system as set forth in claim 12, wherein said control receives a signal that a toilet has been flushed to actuate the solenoid.

14. The system as set forth in claim 4, wherein said stop pin is biased in a direction towards said meter rotor, and said meter rotor being formed with a cam groove at an outer surface, and said stop pin being selectively movable outwardly of said cam groove to allow said metering rotor to rotate, with said stop pin being movable into said cam groove after a predetermined amount of rotation of said meter rotor, and said stop pin stopping rotation of said meter rotor after said precise amount of rotation of said motor rotor and said pump rotor.

15. The system as set forth in claim 14, wherein a control controls the selective movement of said stop pin outwardly of said cam groove.

16. The system as set forth in claim 15, wherein said control receives a signal that a toilet has been flushed to actuate the solenoid.

17. The system as set forth in claim 15, wherein a solenoid is actuated by said control to move said stop pin against the bias force outwardly of said cam groove.

18. The system as set forth in claim 17, wherein said control receives a signal that a toilet has been flushed to actuate the solenoid.

* * * * *